(12) United States Patent
Szentes et al.

(10) Patent No.: US 10,854,190 B1
(45) Date of Patent: Dec. 1, 2020

(54) TRANSCRIPTION ANALYSIS PLATFORM

(71) Applicant: UIPCO, LLC, San Antonio, TX (US)

(72) Inventors: Michael J. Szentes, San Antonio, TX (US); Carlos Chavez, San Antonio, TX (US); Robert E. Lewis, Boerne, TX (US); Nicholas S. Walker, El Paso, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 86 days.

(21) Appl. No.: 15/614,119

(22) Filed: Jun. 5, 2017

Related U.S. Application Data

(60) Provisional application No. 62/349,290, filed on Jun. 13, 2016.

(51) Int. Cl.
| | |
|---|---|
| *G10L 15/01* | (2013.01) |
| *G10L 15/26* | (2006.01) |
| *G06F 40/226* | (2020.01) |
| *G06F 40/268* | (2020.01) |
| *G06F 16/683* | (2019.01) |
| *G10L 15/18* | (2013.01) |
| *G10L 17/20* | (2013.01) |

(52) U.S. Cl.
CPC ............ *G10L 15/01* (2013.01); *G06F 16/685* (2019.01); *G06F 40/226* (2020.01); *G06F 40/268* (2020.01); *G10L 15/1822* (2013.01); *G10L 15/26* (2013.01); *G10L 17/20* (2013.01)

(58) Field of Classification Search
CPC ... G10L 15/01; G06F 17/30746; G06F 17/211
USPC ........................................................ 704/231
See application file for complete search history.

(56) References Cited

U.S. PATENT DOCUMENTS

| | | | | |
|---|---|---|---|---|
| 5,649,060 | A * | 7/1997 | Ellozy ................. | G11B 27/028 704/278 |
| 6,064,957 | A * | 5/2000 | Brandow ............ | G06F 17/2211 704/231 |
| 6,370,504 | B1 * | 4/2002 | Zick ........................ | G10L 15/02 704/200.1 |
| 6,473,778 | B1 * | 10/2002 | Gibbon ................. | G06F 17/211 348/468 |

(Continued)

OTHER PUBLICATIONS

Wagner et al, "The String-to-String Correction Problem." Journal of the Association for Computing Machinery, vol. 21 Issue 1, Jan. 1974, pp. 168-173. (Year: 1974).*

(Continued)

*Primary Examiner* — Daniel C Washburn
*Assistant Examiner* — Oluwadamilola M Ogunbiyi
(74) *Attorney, Agent, or Firm* — Perkins Coie LLP

(57) ABSTRACT

Various embodiments of the present disclosure evaluate transcription accuracy. In some implementations, the system normalizes a first transcription of an audio file and a baseline transcription of the audio file. The baseline transcription can be used as an accurate transcription of the audio file. The system can further determine an error rate of the first transcription by aligning each portion of the first transcription with the portion of the baseline transcription, and assigning a label to each portion based on a comparison of the portion of the first transcription with the portion of the baseline transcription.

11 Claims, 9 Drawing Sheets

(56) References Cited

U.S. PATENT DOCUMENTS

| | | | | |
|---|---|---|---|---|
| 6,535,849 B1* | 3/2003 | Pakhomov | G10L 15/063 | 704/235 |
| 8,571,851 B1* | 10/2013 | Tickner | G06F 17/2785 | 704/1 |
| 8,892,447 B1* | 11/2014 | Srinivasan | G10L 15/01 | 704/2 |
| 9,224,386 B1* | 12/2015 | Weber | G10L 15/06 | |
| 9,478,218 B2* | 10/2016 | Shu | G10L 15/187 | |
| 9,508,338 B1* | 11/2016 | Kaszczuk | G10L 13/02 | |
| 9,679,564 B2* | 6/2017 | Daborn | G10L 15/26 | |
| 2002/0065653 A1* | 5/2002 | Kriechbaum | G10L 15/187 | 704/231 |
| 2003/0004724 A1* | 1/2003 | Kahn | G10L 15/063 | 704/260 |
| 2004/0015350 A1* | 1/2004 | Gandhi | G10L 15/01 | 704/235 |
| 2004/0199385 A1* | 10/2004 | Deligne | G10L 15/063 | 704/235 |
| 2005/0010407 A1* | 1/2005 | Jaroker | G06Q 10/00 | 704/235 |
| 2005/0137867 A1* | 6/2005 | Miller | G10L 15/26 | 704/252 |
| 2005/0228667 A1* | 10/2005 | Duan | G10L 15/197 | 704/256 |
| 2006/0136205 A1* | 6/2006 | Song | G06K 9/6277 | 704/243 |
| 2006/0190263 A1* | 8/2006 | Finke | G10L 15/1822 | 704/270 |
| 2007/0192095 A1* | 8/2007 | Braho | G10L 15/01 | 704/232 |
| 2008/0077583 A1* | 3/2008 | Castro | G06F 16/64 | |
| 2009/0271192 A1* | 10/2009 | Marquette | G09B 13/00 | 704/235 |
| 2010/0205628 A1* | 8/2010 | Davis | H04N 21/482 | 725/25 |
| 2010/0228548 A1* | 9/2010 | Liu | G10L 15/065 | 704/251 |
| 2011/0239119 A1* | 9/2011 | Phillips | G06F 3/0482 | 715/731 |
| 2012/0016671 A1* | 1/2012 | Jaggi | G10L 15/22 | 704/235 |
| 2012/0179694 A1* | 7/2012 | Sciacca | G06F 17/273 | 707/748 |
| 2012/0278337 A1* | 11/2012 | Acharya | G06F 16/7844 | 707/748 |
| 2013/0013305 A1* | 1/2013 | Thompson | G06F 16/367 | 704/235 |
| 2013/0080150 A1* | 3/2013 | Levit | G06F 17/273 | 704/9 |
| 2013/0124984 A1* | 5/2013 | Kuspa | H04N 9/475 | 715/255 |
| 2013/0311181 A1* | 11/2013 | Bachtiger | G06F 16/685 | 704/235 |
| 2014/0088962 A1* | 3/2014 | Corfield | G10L 15/26 | 704/235 |
| 2014/0153709 A1* | 6/2014 | Byrd | H04M 3/42221 | 379/265.09 |
| 2014/0278366 A1* | 9/2014 | Jacob | G10L 15/26 | 704/9 |
| 2015/0039306 A1* | 2/2015 | Sidi | G10L 15/01 | 704/235 |
| 2015/0058006 A1* | 2/2015 | Proux | G10L 15/26 | 704/235 |
| 2015/0269136 A1* | 9/2015 | Alphonso | G06F 17/276 | 704/9 |
| 2016/0078861 A1* | 3/2016 | Mathias | G10L 15/063 | 704/9 |
| 2016/0091967 A1* | 3/2016 | Prokofieva | G06K 9/00597 | 345/156 |
| 2016/0133251 A1* | 5/2016 | Kadirkamanathan | G06F 17/2264 | 704/9 |
| 2016/0246929 A1* | 8/2016 | Zenati | G16H 80/00 | |
| 2017/0323643 A1* | 11/2017 | Arslan | G10L 17/005 | |
| 2018/0061404 A1* | 3/2018 | Devaraj | G10L 15/22 | |
| 2018/0122367 A1* | 5/2018 | Ingmarsson | G10L 15/01 | |
| 2018/0294014 A1* | 10/2018 | Ekambaram | G11B 27/34 | |

OTHER PUBLICATIONS

Barras, C., Zhu, X., Meignier, S., & Gauvain, J. L., "Improving Speaker Diarization." Retrieved from <https://hal.archives-ouvertes.fr/hal-01451540/document> on Apr. 3, 2020. (Year: 2004).*

Barras, Claude, et al. "Multistage speaker diarization of broadcast news." IEEE Transactions on Audio, Speech, and Language Processing 14.5: 1505-1512. (Year: 2006).*

Huijbregts, Marijn, David A. van Leeuwen, and Chuck Wooters. "Speaker diarization error analysis using oracle components." IEEE Transactions on Audio, Speech, and Language Processing 20.2: 393-403. (Year: 2011).*

* cited by examiner

| E | F | G | H | I | J |
|---|---|---|---|---|---|
| 11'00" phone call | | Counter | Ground Truth | Compare | Vendor A |
| 2ab95612 | "stolen" phone call | 1 | THANK | c | THANK |
| c/(c+i+s+d) | 55.98% | 2 | YOU | c | YOU |
| c | 1034 | 3 | FOR | s | I |
| i | 24 | 4 | CHOOSING | s | CAN'T |
| s | 321 | 5 | U-S-A-A | s | THING |
| d | 468 | 6 | THIS | s | YOU |
| | | 7 | IS | d | |
| | | 8 | | i | THINK |
| 2/30" phone call | | 9 | | i | THAT'S |
| 5d948a8f | "military" phone call | 10 | CARLA | s | THE |
| c | 47.80% | 11 | MAY | s | CAN |
| i | 98 | 12 | I | c | I |
| s | 13 | 13 | HELP | c | HELP |
| d | 52 | 14 | YOU | c | YOU |
| | 42 | 15 | UH | s | |
| | | 16 | YES | s | IF |
| | | 17 | | c | I |
| 50'00" phone call | | 18 | HAVE | c | HAVE |
| 8d4ff6df | "wonderful day" | 19 | UH | d | |
| c | 35.84% | 20 | TWO | c | TWO |
| i | 2477 | 21 | UHM | d | |
| s | 305 | 22 | EXCUSE | s | IF |
| d | 1467 | 23 | ME! | s | YOU |
| | 2663 | 24 | HAVE | c | HAVE |
| | | 25 | TWO | c | TWO |
| | | 26 | QUESTIONS | c | QUESTIONS |

502 — (points to Vendor A column upper section)
504 — (points to "THAT'S" cell)
506 — (points to lower Vendor A section)
500

*FIG. 5*

TRANSCRIPTION ANALYSIS PLATFORM

CROSS-REFERENCE TO RELATED APPLICATIONS

This application is a non-provisional of and claims priority to U.S. Provisional Application No. 62/349,290, filed on Jun. 13, 2016, entitled "TRANSCRIPTION ANALYSIS PLATFORM," which is hereby incorporated by reference in its entirety for all purposes.

TECHNICAL FIELD

Various embodiments of the present disclosure generally relate to a transcription analysis platform. More specifically, various embodiments of the present disclosure relate to methods and systems for analyzing and evaluating transcriptions.

BACKGROUND

Generally, vendors providing transcription services each use their own formulas to present and market their speech to text accuracy.

BRIEF DESCRIPTION OF THE DRAWINGS

Embodiments of the present disclosure will be described and explained through the use of the accompanying drawings in which:

FIG. 5 illustrates examples of comparing a baseline transcription and a vendor transcription in accordance with various embodiments of the present disclosure;

DETAILED DESCRIPTION

Figure 1:
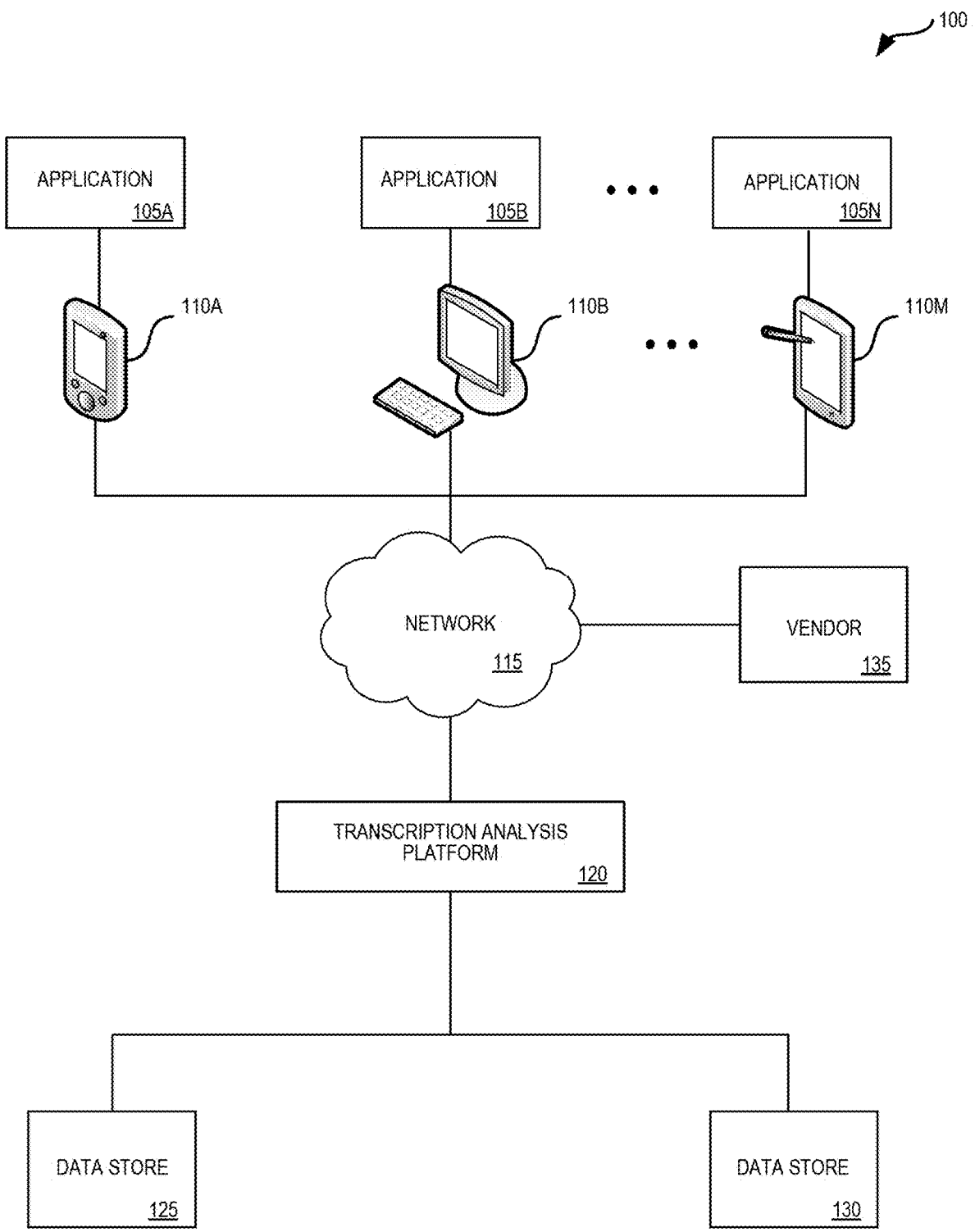
FIG. 1 illustrates an example of a network-based operating environment in accordance with various embodiments of the present disclosure.

Various embodiments of the present disclosure generally relate to a transcription analysis platform. More specifically, various embodiments of the present disclosure relate to methods and systems for analyzing and evaluating transcriptions.

Transcriptions can have poor accuracy, particularly where the audio file includes multiple speakers and where the vendor has no prior experience with the speakers (independent speech recognition). Generally, vendors providing transcription services each use their own formulas to present and market their speech to text accuracy. Prior to the current technology, no solution existed for performing objective accuracy testing across multiple vendors.

According to various implementations of the present disclosure, a set of baseline transcriptions are created from a set of audio files. The baseline transcriptions can be used as ground truth transcriptions of the audio files (i.e., considered as an accurate transcription of the audio file). The baseline transcriptions can be created by humans or by a machine using extremely accurate transcription technology (e.g., dependent speech recognition). The same audio files can be sent to various vendors for transcription. Upon receiving the transcriptions of the audio files from the vendors, the baseline transcriptions and the vendor transcriptions can be normalized. For example, the words that can be spelled different ways can be changed to a standardized spelling of the word in the text (e.g., "uhm" and "umm" can be changed to "um") and spoken numbers can be written in a standardized manner (e.g., "twelve hundred" or "one thousand, two hundred" can be changed to "1200"). After the transcriptions are normalized, the system can determine error rates of each transcription by comparing the vendor transcriptions to the baseline transcriptions.

The system can determine various error rates. For example, the system can determine a word error rate, a phrase error rate, and speaker error rate. To determine a word error rate, each word of the baseline transcription can be put into a separate row in the same column and aligned with each word of the vendor transcription. To create/maintain alignment, the system can add a row to the vendor transcription where a word was deleted from the vendor transcription or add a row to the baseline transcription where a word was inserted in the vendor transcription. The system can assign a differentiator label to each word/space of the vendor transcription. The differentiator labels can indicate whether the word was transcribed correctly, and, if the word was not transcribed correctly, an indication of the error (e.g., inserted, deleted, or substituted).

The system can use the differentiator labels to calculate a word error rate. For example, a word error rate can be calculated by dividing the number of correct words by a sum of the number of substituted, deleted, inserted and correct words). The error rates for numerous transcribed audio files can be evaluated, and the results can be displayed graphically (e.g., using heat maps) and compared to error rates of other entities. A similar analysis can be done for phrases (e.g. a grouping of words) or speakers (e.g., indicating a change in speaker) in addition to or instead of analyzing the word error rate.

This disclosure describes vendor transcription analysis and evaluation designed to identify adequately and poorly performing vendors and further to identify problematic words, phrases or areas where improvements can be made. Various embodiments may provide one or more of the following technological improvements: (1) automatic, accurate, and objective analysis of transcriptions; (2) increased efficiency in evaluating transcription accuracy and overall vendor performance; (3) a particular method of formatting the transcription data; and (4) a standardized method of testing and evaluating vendors' transcription performance.

As used herein, the term "user" is used synonymously with any person or individual. In the following description, for the purposes of explanation, numerous specific details are set forth in order to provide a thorough understanding of embodiments of the present disclosure. However, upon reading the disclosure, it will be apparent to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical disks, read-only memories (ROMs), random-access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (e.g., a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch). In some embodiments, applications 105A-105N may be stored on one or more computing devices 110A-110M or may be stored remotely on a server (in the "cloud"). These computing devices can include mechanisms for receiving and sending traffic by connecting through network 115 to transcription analysis platform 120, vendor 135, and data stores 125 and 130.

Vendor 135 may provide transcription services. Vendor 135 may receive audio files and communicate transcriptions of the audio files to transcription analysis platform 120.

Computing devices 110A-110M may be configured to communicate via the network 115 with transcription analysis platform 120. In some embodiments, computing devices 110A-110M can retrieve or submit information to transcription analysis platform 120 and run one or more applications 105A-105N with customized content retrieved by transcription analysis platform 120 and data stores 125 and 130. For example, computing devices 110A-110M can execute a browser application or a customized client to enable interaction between the computing devices 110A-110M, transcription analysis platform 120, and data stores 125 and 130. In some embodiments, transcription analysis platform 120 can be a server. In an example, computing devices 110A-110M may be used to conduct a conversation between a user and a service provider or view the transcription results.

Network 115 can be any combination of local area and/or wide area networks, using wired and/or wireless communication systems. Network 115 can be or could use any one or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies, languages, and/or formats, including hypertext markup language (HTML) or extensible markup language (XML). In addition, all or some links can be encrypted using conventional encryption technologies, such as secure sockets layer (SSL), transport layer security (TLS), and Internet Protocol security (IPsec).

Data stores 125 and 130 can be used to manage storage and access to vendor information, baseline transcriptions, audio files, vendor transcriptions, vendor evaluation data, and graphical analysis of vendor performance. Data stores 125 and 130 may be a data repository of a set of integrated objects that are modeled using classes defined in database schemas. Data stores 125 and 130 may further include flat files that can store data. Transcription analysis platform 120 and/or other servers may collect and/or access data from vendor 135, and the data stores 125 and 130.

Figure 2:
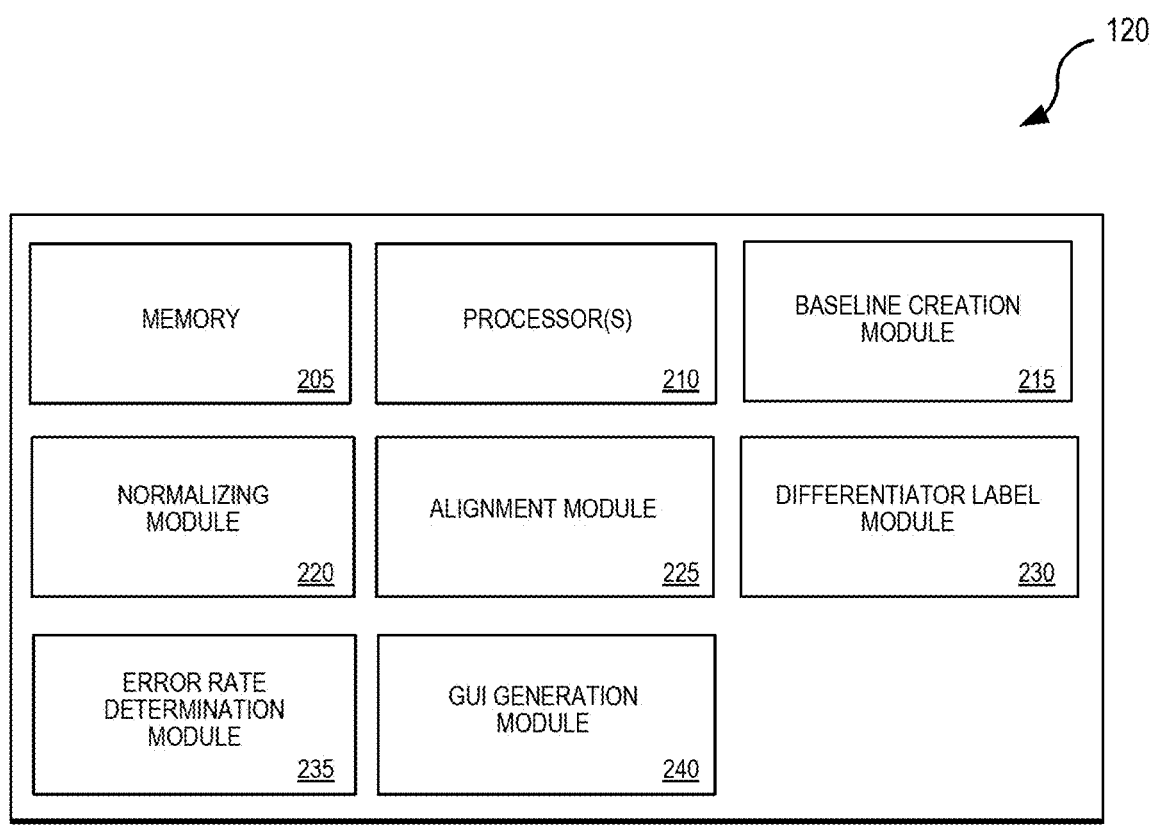
FIG. 2 illustrates various components of a transcription analysis platform that may be used in accordance with various embodiments of the present disclosure.

FIG. 2 illustrates a set of components within transcription analysis platform 120 according to one or more embodiments of the present disclosure. According to the embodiments shown in FIG. 2, transcription analysis platform 120 can include memory 205, one or more processors 210, baseline creation module 215, normalizing module 220, alignment module 225, differentiator label module 230, error rate determination module 235, and graphical user interface (GUI) generation module 240. Other embodiments of the present invention may include some, all, or none of these modules and components, along with other modules, applications, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of baseline creation module 215, normalizing module 220, alignment module 225, differentiator label module 230, error rate determination module 235, and GUI generation module 240. Generally, memory 205 can include any device, mechanism, or populated data structure used for storing information. In accordance with some embodiments of the present disclosure, memory 205 can encompass, but is not limited to, any type of volatile memory, non-volatile memory, and dynamic memory. For example, memory 205 can be random-access memory, memory storage devices, optical memory devices, magnetic media, floppy disks, magnetic tapes, hard drives, SIMMs, SDRAM, DIMMs, RDRAM, DDR RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Baseline creation module 215 can create a baseline transcription of an audio file. The baseline transcription can be used as the ground truth or accurate version of the transcription with which other transcriptions will be compared against. Baseline creation module 215 can create the transcription using dependent speech recognition techniques and/or transcribed by a human. In some embodiments, personally identifiable information can be scrubbed from the audio file prior to sending the file to the vendor or from the baseline transcription being generated.

Normalizing module 220 can format or normalize the baseline transcription. Normalizing can include replacing a number that is spelled out (e.g., "one thousand") with an actual number in a number format (e.g., "1000") and changing words with various spellings (e.g., "grey") to reflect a standardized spelling (e.g., "gray"). Normalizing can also include removing unimportant utterances, like "us" or "ums", which may not be transcribed by the vendor products. Transcribed audio files received from vendors undergo the same normalizing process by normalizing module 220.

Alignment module 225 can align a portion (e.g., each word, phrases) of the baseline transcription with the same portion of the vendor transcription. The alignment can be vertical. For example, each word of the baseline transcription can be put into a separate row in a column and the same can be done for the vendor transcription. The words can be aligned in the same row but different columns so the words in each file are matching (or supposed to be matching). Where a word is missing in the vendor transcription (i.e., deleted word) compared to the baseline transcription, a row may be added to the vendor transcription to keep the text aligned. Similarly, where a word is added in the vendor transcription (i.e., inserted words) compared to the baseline transcription, a row may be added to the baseline transcription.

Differentiator label module 230 can label each word of the vendor transcription as either "correct" or "error." The errors may be specified in some implementations. For example, the errors can be labeled as "deleted" (i.e., a word was deleted), "inserted" (i.e., a word was added), or "substituted" (i.e., a word was transcribed incorrectly). Differentiator label module 230 can generate an additional column to indicate the status of the word in each row. The statuses can be labeled as follows: "c" (i.e., correct), "s" (i.e., substituted), "i" (i.e., inserted), "a" (added). In some embodiments, differentiator label module 230 scores the words (e.g., 1 point for correct, −2 for deleting a word, 0 for adding a word, and −1 for substituting a word). If the vendor transcription is being evaluated for accuracy on indicating a new speaker, points can be given or taken away each time a speaker change is correct and a speaker is identified.

Error rate determination module 235 determines an error rate of the transcription. To determine a word error rate of a particular transcription, error rate determination module 235 can divide a correct number of words by the sum of the number of insertions, the number of deletions, the number of substitutions, and the number of correct words. Vendor results can be calculated for each transcription or a combination of transcriptions to provide a score for the vendor. For example, a vendor may have a score of 69.7%, which indicates that the vendor is transcribing 69.7% of the words correctly. Such numbers can be objectively compared to other vendors. Various heat maps and other displays of the vendor's performance can be generated.

GUI generation module 240 can generate one or more GUI screens that allow for interaction with a user. In at least one embodiment, GUI generation module 240 generates a GUI for receiving and/or conveying information to the user's computing device. Such information may include a graphical representation of the vendor's transcription performance over a number of transcriptions.

Figure 3:
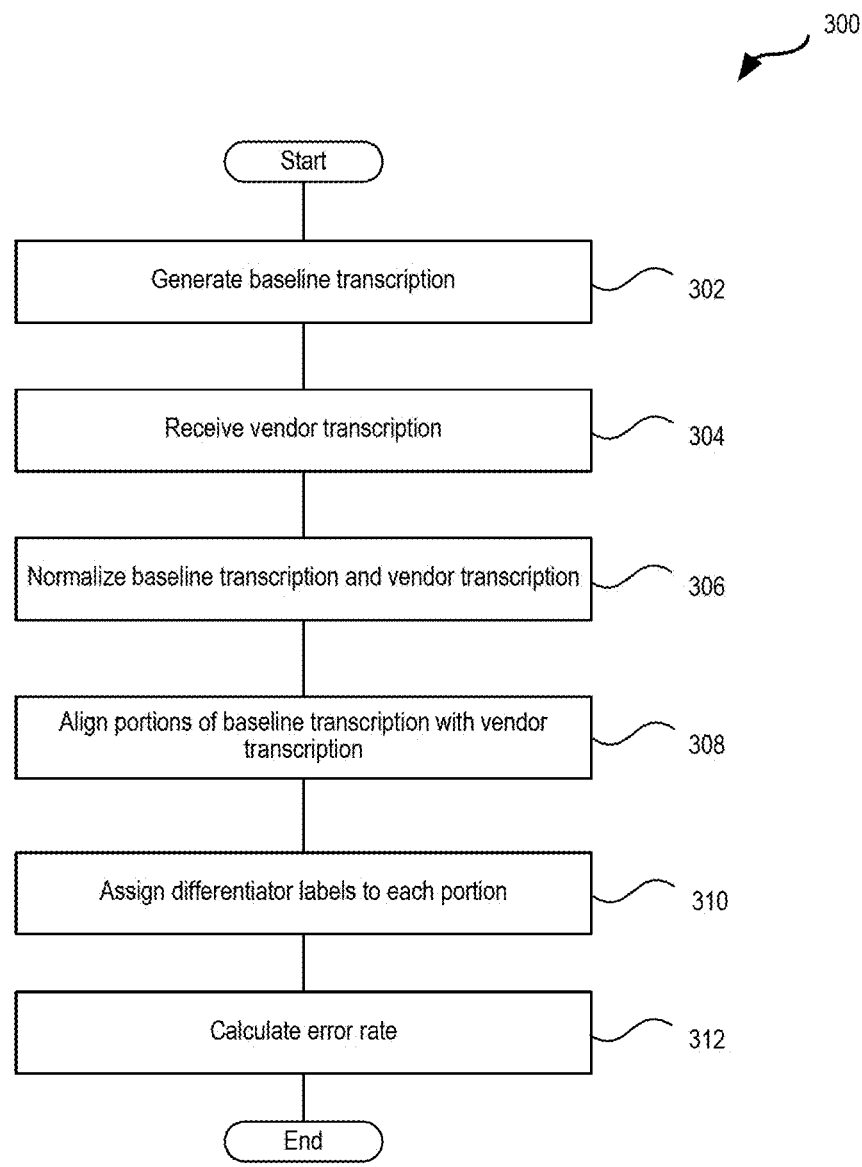
FIG. 3 is a flowchart illustrating a set of operations for evaluating a transcription in accordance with various embodiments of the present disclosure.

FIG. 3 is a flowchart 300 illustrating a set of operations for evaluating a transcription. In some embodiments, fewer than all of the operations in each set of operations are performed, whereas in other embodiments, additional operations are performed. Moreover, in some embodiments, the operations may be performed in different orders or in parallel. The operations can be performed by various components of the transcription analysis platform 120 illustrated in FIG. 2.

Generating operation 302 generates a baseline transcription of an audio file. Receiving operation 304 receives a vendor transcription of the same audio file. Normalizing operation 306 normalizes the baseline transcription and the vendor transcription, separately. Aligning operation 308 vertically aligns portions of the baseline transcription with portions of the vendor transcription. Aligning may include adding rows to the baseline transcription or to the vendor transcription to ensure that the portions are aligned correctly. Assigning operation 310 assigns a differentiator label to each portion. Calculating operation 312 calculates an error rate of the vendor transcription using the differentiator labels.

Figure 4:
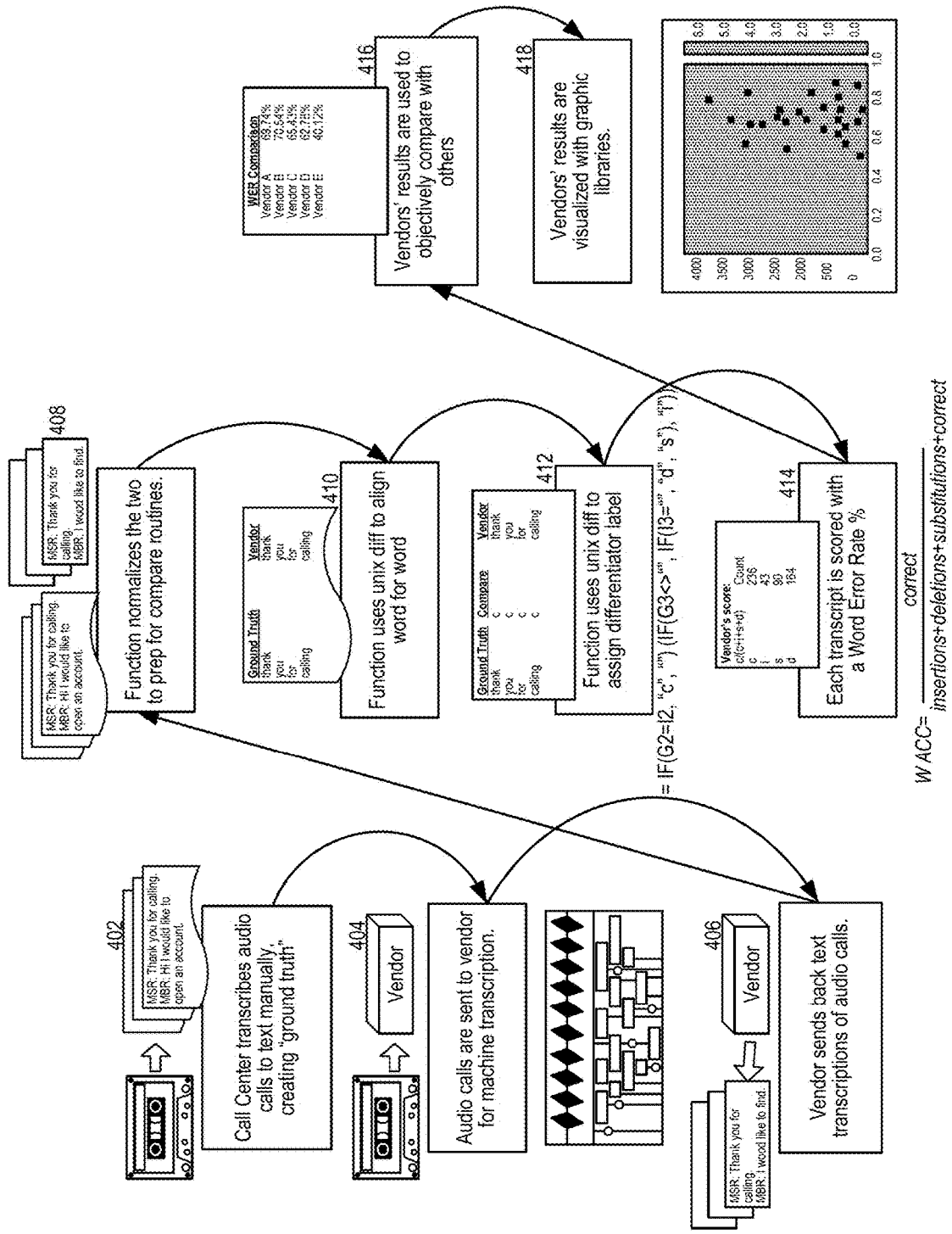
FIG. 4 is a diagram illustrating a set of operations for evaluating a transcription in accordance with various embodiments of the present disclosure.

FIG. 4 is a diagram illustrating a set of operations for evaluating a transcription. A call center (or other organization) can transcribe audio calls to text, manually or using other means, to create a ground truth of the audio file of the call (402). The system can then send the audio file of the call to the vendor for a machine transcription (404). The vendor can send back a text transcription of the audio file of the call (406). The system can normalize the ground truth text file and the vendor text file to prepare for compare routines (408). The system can use a diff function to align the files word by word (410). The system can assign differentiator labels to each of the words in the vendor file (412). The vendor transcript can be scored with a word error rate (414). The system can compare the vendor's results with other vendor's results (416). The system can create visuals of the results using graphic libraries (418).

FIG. 5 illustrates examples 500 of comparing a baseline transcription and a vendor transcription in accordance with various embodiments of the present disclosure. As seen, the ground truth or baseline transcription is broken out word-by-word and compared with a word-by-word version of the transcription by the vendor. In the example shown in 502, in line 8, the word "think" was inserted into the vendor's file and so a row is inserted into the baseline transcription to ensure that the transcriptions are matched up word for word and labeled as "i" in the compare label column. In 504, in lines 10 and 11, the words "the" and "can" were substituted and thus labeled as "s" for substituted in the compare column. In the example shown in 506, in line 19, the word "uh" was deleted from the vendor's transcription and labeled a "d" in the compare label column. A line is added to the vendor's transcription to ensure that the transcriptions are matched word for word otherwise despite the error.

Figure 6:
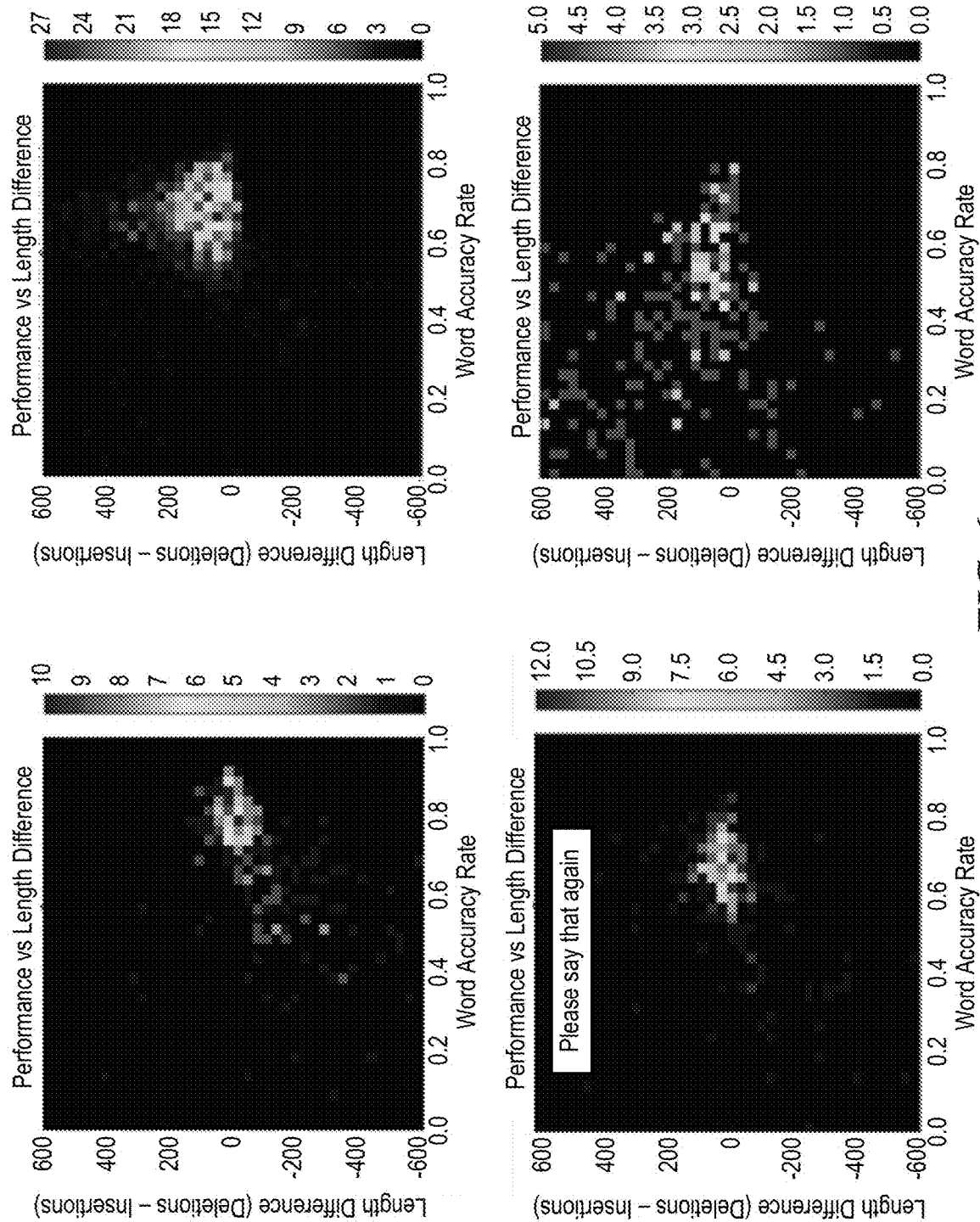
FIGS. 6-8 are examples of charts that indicate transcription performance of various vendors.
Figure 7:
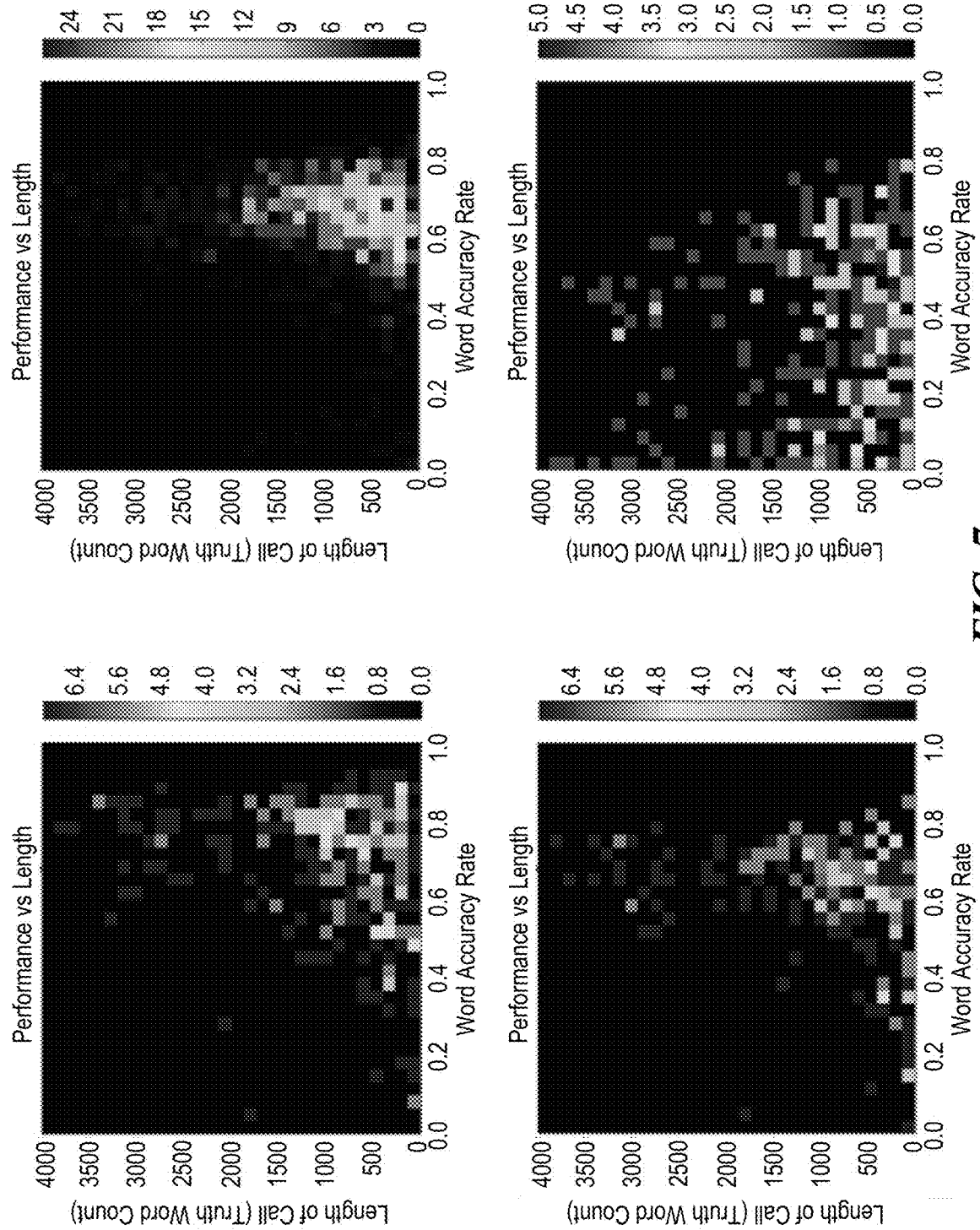
Figure 8:
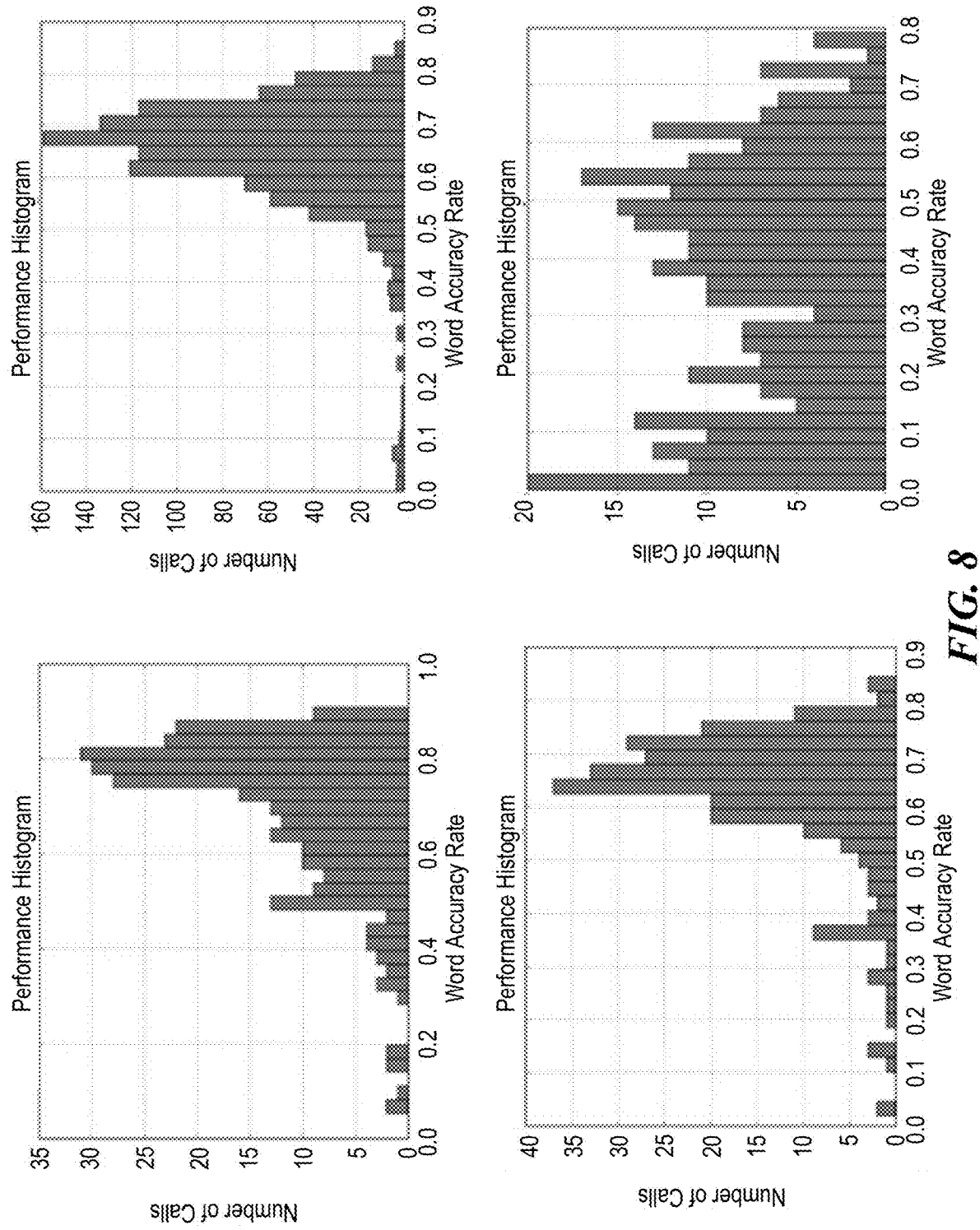

FIGS. 6-8 are examples of charts that indicate transcription performance of various vendors. For example, the heat maps in FIG. 6 each represent a different vendor. The x-axis is error rate and the y-axis is length difference of the vendor transcription compared to the baseline transcription (i.e., deletions and insertions). Each dot on the heat map can represent at least one transcription and can be colored according to a color if more than one transcription falls within that data point. Thus, the color can indicate a frequency of that exact outcome on the chart. On the right, a color indicator (shown in grayscale) can indicate how many of the transcriptions applied to that specific word accuracy rate and how many words were added or deleted.

FIG. 7 shows heat maps for four vendors. The x-axis represents the word accuracy rate and the y-axis represents the length of the call (i.e., number of words) according to the baseline transcription. Each dot can represent a transcription and can be color coded, as described above.

FIG. 8 shows histograms for four vendors showing the word accuracy rate on the x-axis and the number of calls on the y-axis.

Computer System Overview

Figure 9:
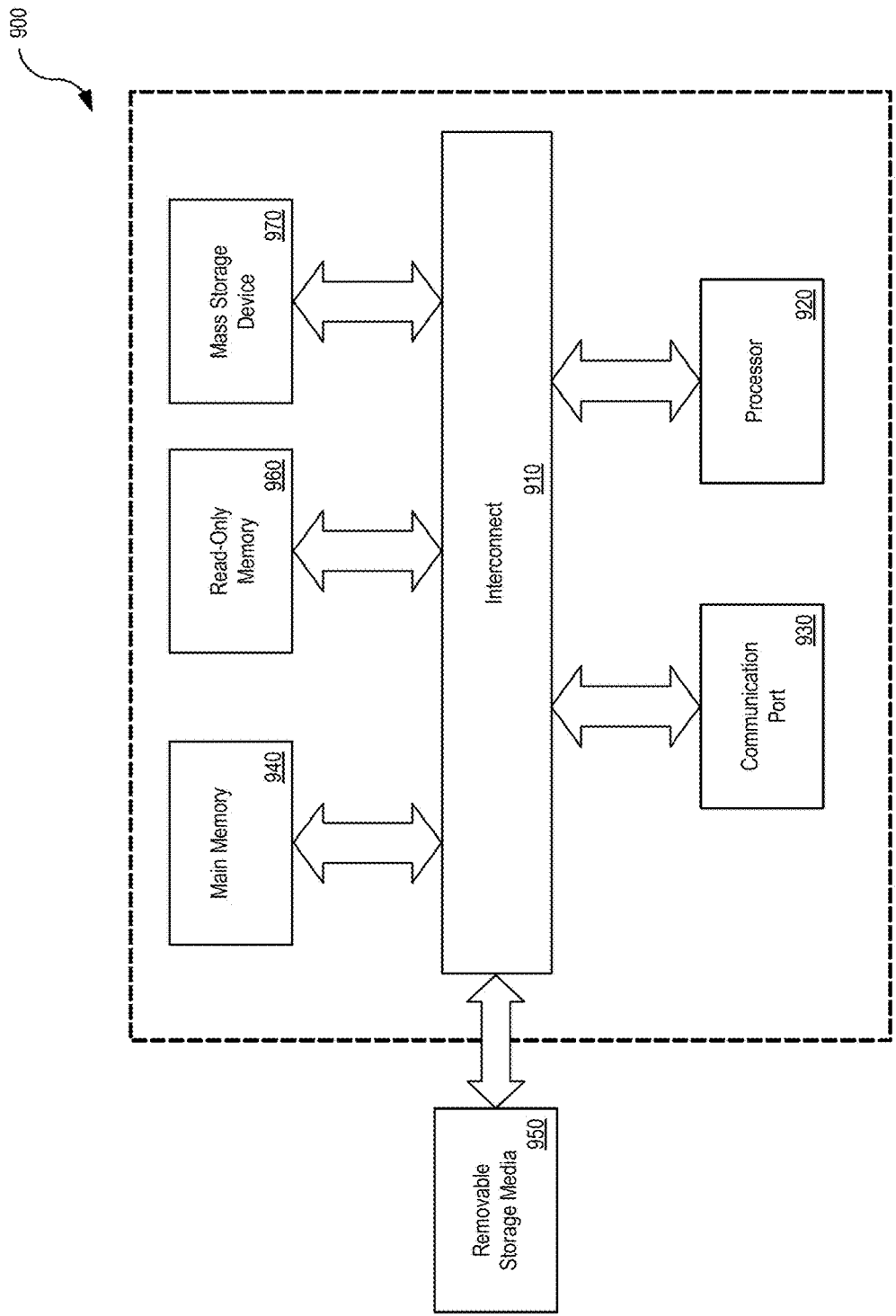
FIG. 9 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 9 is an example of a computer system 900 with which embodiments of the present disclosure may be utilized. According to the present example, the computer system includes an interconnect 910, at least one processor 920, at least one communication port 930, a main memory 940, a removable storage media 950, a read-only memory 960, and a mass storage device 970.

Processor(s) 920 can be any known processor, such as, but not limited to, Intel® Itanium® or Itanium 2® processor(s), or AMD® Opteron® or Athlon MP® processor(s), or Motorola® lines of processors. Communication port(s) 930 can be any of an RS-232 port for use with a modem-based dial-up connection, a 10/100 Ethernet port, or a Gigabit port using copper or fiber. Communication port(s) 930 may be chosen, depending on a network, such as a local area network (LAN), wide area network (WAN), or any network to which the computer system 900 connects.

Main memory 940 can be random-access memory (RAM) or any other dynamic storage device(s) commonly known in the art. Read-only memory 960 can be any static storage device(s), such as programmable read-only memory (PROM) chips for storing static information, such as instructions for processor 920.

Mass storage device 970 can be used to store information and instructions. For example, hard disks such as the Adaptec® family of SCSI drives, an optical disc, an array of disks such as RAID, the Adaptec family of RAID drives, or any other mass storage devices may be used.

Interconnect 910 communicatively couples processor(s) 920 with the other memory, storage, and communication blocks. Interconnect 910 can be a PCI/PCI-X- or SCSI-based system bus, depending on the storage devices used.

Removable storage media 950 can be any kind of external hard drives, floppy drives, IOMEGA® Zip Drives, CD-ROM, compact disc re-writable (CD-RW), or digital video disc read-only memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a local area network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communication between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for evaluating transcriptions. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A non-transitory computer-readable storage medium containing a set of instructions that, when executed by one or more processors, cause a machine to:
normalize a first transcription of an audio file and a baseline transcription of the audio file,
wherein the baseline transcription is used as an accurate transcription of the audio file;
remove personally identifiable information from the audio file;
determine a word error rate of the first transcription by:
vertically aligning each word of the first transcription with the corresponding word of the baseline transcription in a record,
assigning a differentiator label to each word of the first transcription based on a comparison of the word of the first transcription with the corresponding word of the baseline transcription,
wherein the differentiator label indicates whether each word in the first transcription is a type of correct, inserted, deleted, or substituted,
wherein each type of the differentiator label is used at least once in the first transcription, and
wherein vertically aligning each word of the first transcription comprises:
in response to the first transcription including an inserted word, inserting a first row into the baseline transcription in the row that the inserted word was added to the first transcription such that each subsequent word in the first transcription continues to be aligned with the corresponding word of the baseline transcription, and
generating the word error rate based on determination of whether each word, as vertically aligned in the first transcription, has a differentiator label corresponding to correct, inserted, deleted, or substituted;
determine a speaker error rate by indicating a number of times the first transcription correctly indicates a speaker change and a speaker identification; and
generate a graphical display of performance, wherein the graphical display is a heat map and includes an indication of the word error rate plotted in a x-axis and a length difference of the first transcription compared to the baseline transcription in a y-axis.

2. The non-transitory computer-readable storage medium of claim 1, wherein the set of instructions that, when executed by the one or more processors, causes the machine to normalize the first transcription and the baseline transcription further cause the machine to automatically change words and numbers to a standardized spelling or appearance of the words and the numbers.

3. The non-transitory computer-readable storage medium of claim 1, wherein in response to the first transcription having a deleted word, the set of instructions that, when executed by the one or more processors, causes the machine to vertically align the each word of the first transcription with the corresponding portion of the baseline transcription, further causes the machine to insert a second row into the first transcription where the deleted word was deleted from the first transcription.

4. The non-transitory computer-readable storage medium of claim 1, wherein generating the word error rate based on determination of whether each word has a differentiator label corresponding to correct, inserted, deleted, or substituted comprises dividing a number of correct words by a sum of at least a number of words with a label corresponding to inserted, a number of words with a label corresponding to deleted, and a number of words with a label corresponding to substituted, and the number of the correct words.

5. The non-transitory computer-readable storage medium of claim 1, further comprising determining a phrase error rate, wherein a phrase comprises at least two words.

6. The non-transitory computer-readable storage medium of claim 1, wherein the set of instructions when executed by the one or more processors, further causes the machine to:
determine word error rates for additional transcriptions generated by an entity; and
generate a graphical display of performance of the entity, wherein the graphical display includes an indication of the word error rate plotted against one of: length of the transcription, type of error, or number of the transcriptions.

7. The non-transitory computer-readable storage medium of claim 1, wherein the set of instructions when executed by the one or more processors, further causes the machine to generate the baseline transcription using dependent speaker technology.

8. A system for evaluating transcriptions, the system comprising:
a memory; and
a processor in communication with the memory, the processor operable to execute software modules, the software modules comprising:
a normalizing module operable to normalize a first transcription of an audio file and a baseline transcription of the audio file,
wherein the baseline transcription is used as an accurate transcription of the audio file,
a removing module operable to remove personally identifiable information from the audio file,
an alignment module operable to align each word of the first transcription with a corresponding word of the baseline transcription in a record,
a differentiator label module operable to assign a differentiator label to each word of the first transcription based on a comparison of the word of the first transcription with the corresponding word of the baseline transcription,
wherein the differentiator label indicates whether each word in the first transcription is a type of correct, inserted, deleted, or substituted,
wherein each type of the differentiator label is used at least once in the first transcription, and
an error rate determination module operable to:
determine a word error rate of the first transcription based on determinations of whether each word, as aligned in the first transcription, has a differentiator label corresponding to correct, inserted, deleted, or substituted in the differentiator labels assigned to each word of the first transcription,
wherein in response to the first transcription including an inserted word, the alignment module is operable to insert a row into the baseline transcription in the row that the inserted word was added to the first transcription such that each subsequent word in the first transcription continues to be aligned with the corresponding word of the baseline transcription, determine a speaker error rate by indicating a number of times the first transcription correctly indicates a speaker change and a speaker identification; and generate a graphical display of performance, wherein the graphical display is a heat map and includes an indication of the word error rate plotted in a x-axis and a length difference of the first transcription compared to the baseline transcription in a y-axis.

9. The system of claim 8, wherein when the first transcription deletes a word, the alignment module is operable to insert a row into the first transcription where the deleted word was deleted from the first transcription.

10. The system of claim 8, wherein generating the word error rate based on determinations of whether each word has a differentiator label corresponding to correct, inserted, deleted, or substituted comprises dividing a number of correct words by a sum of a number of correct words, a number of words with a label corresponding to inserted, a number of words with a label corresponding to deleted, and a number of words with a label corresponding to substituted.

11. A computerized method comprising:

normalizing, by a processor, a first transcription of an audio file and a baseline transcription of the audio file, wherein the baseline transcription is used as an accurate transcription of the audio file, removing personally identifiable information from the audio file;

vertically aligning, by the processor, each word of the first transcription with a corresponding word of the baseline transcription in a record;

assigning, by the processor, a differentiator label to each word of the first transcription based on a comparison of the word of the first transcription with the corresponding word of the baseline transcription;

determining, by the processor, a word error rate of the first transcription based on determinations of whether each word, as vertically aligned in the first transcription, has a differentiator label corresponding to correct, inserted, deleted, or substituted in the differentiator labels assigned to each word of the first transcription, wherein the differentiator label indicates whether each word in the first transcription is a type of correct, inserted, deleted, or substituted, wherein each type of the differentiator label is used at least once in the first transcription, wherein vertically aligning each word of the first transcription comprises:

in response to the first transcription including an inserted word, inserting a first row into the baseline transcription in the row that the inserted word was added to the first transcription such that each subsequent work in the first transcription continues to be aligned with the corresponding word of the baseline transcription;

determining a speaker error rate by indicating a number of times the first transcription correctly indicates a speaker change and a speaker identification;

determining a phrase error rate, wherein a phrase comprises at least two words; and generating a graphical display of performance, wherein the graphical display is a heat map and includes an indication of the word error rate plotted in a x-axis and a length difference of the first transcription compared to the baseline transcription in a y-axis.

\* \* \* \* \*